United States Patent
Yu et al.

(10) Patent No.: US 8,402,334 B2
(45) Date of Patent: Mar. 19, 2013

(54) SYSTEM AND METHOD FOR HYBRID AUTOMATIC REPEAT REQUEST (HARQ) FUNCTIONALITY IN A RELAY NODE

(75) Inventors: Yi Yu, Irving, TX (US); James Earl Womack, Bedford, TX (US); Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 967 days.

(21) Appl. No.: 12/337,229

(22) Filed: Dec. 17, 2008

(65) Prior Publication Data
US 2010/0153806 A1    Jun. 17, 2010

(51) Int. Cl.
*G06F 11/00* (2006.01)
(52) U.S. Cl. ........................................................ 714/749
(58) Field of Classification Search .................. 714/763, 714/749
See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 | 8/2004 | Larsen | |
| 7,054,633 B2 | 5/2006 | Seo et al. | |
| 7,061,879 B2 | 6/2006 | Oprescu-Surcobe et al. | |
| 7,130,614 B2 | 10/2006 | Sreemanthula et al. | |
| 7,227,851 B1 | 6/2007 | Gopalakrishnan et al. | |
| 7,349,665 B1 | 3/2008 | Zhu et al. | |
| 7,386,036 B2 | 6/2008 | Pasanen et al. | |
| 7,564,827 B2 * | 7/2009 | Das et al. | 370/342 |
| 7,577,124 B2 | 8/2009 | Yomo et al. | |
| 7,602,843 B2 | 10/2009 | Cho et al. | |
| 7,673,211 B2 * | 3/2010 | Meyer et al. | 714/748 |
| 7,706,408 B2 | 4/2010 | Takagi et al. | |
| 7,724,767 B2 | 5/2010 | Oksman | |
| 7,742,448 B2 | 6/2010 | Ramachandran et al. | |
| 7,830,837 B2 * | 11/2010 | Park et al. | 370/329 |
| 7,873,002 B2 | 1/2011 | Cai | |
| 7,898,948 B2 | 3/2011 | DiGirolamo et al. | |
| 8,121,552 B2 | 2/2012 | Agami et al. | |
| 8,228,851 B2 | 7/2012 | Wu | |
| 2002/0155839 A1 | 10/2002 | Nisbet | |
| 2002/0187746 A1 | 12/2002 | Cheng et al. | |
| 2003/0096631 A1 | 5/2003 | Kayama et al. | |
| 2003/0103480 A1 | 6/2003 | You et al. | |
| 2004/0042492 A1 | 3/2004 | Suzuki et al. | |

(Continued)

FOREIGN PATENT DOCUMENTS

| | | |
|---|---|---|
| EP | 1534035 A1 | 5/2005 |
| EP | 1773091 A2 | 4/2007 |

(Continued)

OTHER PUBLICATIONS

Rohde & Schwarz; "UMTS Long Term Evolution (LTE) Technology Introduction;" Application Note 1MA111; Sep. 2008; 55 pages.

(Continued)

*Primary Examiner* — Amine Riad
(74) *Attorney, Agent, or Firm* — Conley Rose, P.C.; J. Robert Brown, Jr.

(57) ABSTRACT

A relay node. The relay node includes a first hybrid automatic repeat request (HARQ) entity providing a first HARQ functionality. The relay node further includes a second HARQ entity providing a second HARQ functionality.

29 Claims, 7 Drawing Sheets

U.S. PATENT DOCUMENTS

| | | | |
|---|---|---|---|
| 2004/0063451 A1 | 4/2004 | Bonta et al. | |
| 2005/0042987 A1 | 2/2005 | Lee et al. | |
| 2005/0232212 A1 | 10/2005 | Kang et al. | |
| 2006/0183421 A1 | 8/2006 | Proctor, Jr. et al. | |
| 2007/0104148 A1 | 5/2007 | Kang et al. | |
| 2007/0153734 A1 | 7/2007 | Lee et al. | |
| 2007/0155315 A1 | 7/2007 | Lee et al. | |
| 2007/0171925 A1 | 7/2007 | Tanimoto | |
| 2007/0206531 A1 | 9/2007 | Pajukoski et al. | |
| 2007/0253421 A1 | 11/2007 | Cai | |
| 2008/0002610 A1 | 1/2008 | Zheng et al. | |
| 2008/0025323 A1 | 1/2008 | Khan | |
| 2008/0043671 A1 | 2/2008 | Moon et al. | |
| 2008/0043710 A1 | 2/2008 | Zhou et al. | |
| 2008/0081628 A1 | 4/2008 | Ye et al. | |
| 2008/0089282 A1 | 4/2008 | Malladi et al. | |
| 2008/0107076 A1 | 5/2008 | Ramachandran et al. | |
| 2008/0107078 A1 | 5/2008 | Viorel et al. | |
| 2008/0108303 A1 | 5/2008 | Okuda | |
| 2008/0108304 A1 | 5/2008 | Suga | |
| 2008/0159337 A1 | 7/2008 | Lee | |
| 2008/0165776 A1 | 7/2008 | Tao et al. | |
| 2008/0212513 A1 | 9/2008 | Tao et al. | |
| 2008/0225765 A1 | 9/2008 | Marinier et al. | |
| 2008/0225772 A1 | 9/2008 | Xu | |
| 2008/0227461 A1 | 9/2008 | Dayal et al. | |
| 2008/0232284 A1 | 9/2008 | Dalsgaard et al. | |
| 2008/0232493 A1 | 9/2008 | Zhang et al. | |
| 2008/0247375 A1 | 10/2008 | Muharemovic et al. | |
| 2008/0285500 A1 | 11/2008 | Zhang et al. | |
| 2008/0285501 A1 | 11/2008 | Zhang et al. | |
| 2008/0293358 A1 | 11/2008 | Andersson et al. | |
| 2008/0310389 A1* | 12/2008 | Suzuki et al. | 370/346 |
| 2009/0010199 A1 | 1/2009 | Adachi et al. | |
| 2009/0046641 A1 | 2/2009 | Wang et al. | |
| 2009/0061892 A1 | 3/2009 | Lee et al. | |
| 2009/0111476 A1 | 4/2009 | Hamalainen et al. | |
| 2009/0116423 A1 | 5/2009 | Ni et al. | |
| 2009/0154533 A1 | 6/2009 | Khayrallah et al. | |
| 2009/0190522 A1 | 7/2009 | Horn et al. | |
| 2009/0191882 A1 | 7/2009 | Kovacs et al. | |
| 2009/0196332 A1 | 8/2009 | Miyatani | |
| 2009/0239568 A1 | 9/2009 | Bertrand et al. | |
| 2009/0252079 A1 | 10/2009 | Zhang et al. | |
| 2009/0264077 A1 | 10/2009 | Damnjanovic | |
| 2009/0276672 A1* | 11/2009 | Lee et al. | 714/749 |
| 2009/0291679 A1 | 11/2009 | Wu | |
| 2009/0303918 A1 | 12/2009 | Ma et al. | |
| 2009/0313518 A1 | 12/2009 | Shen et al. | |
| 2009/0325480 A1 | 12/2009 | Ji et al. | |
| 2009/0325618 A1 | 12/2009 | Aiba et al. | |
| 2010/0027457 A1 | 2/2010 | Okuda | |
| 2010/0027458 A1 | 2/2010 | Wu et al. | |
| 2010/0039947 A1 | 2/2010 | Li et al. | |
| 2010/0046413 A1 | 2/2010 | Jin et al. | |
| 2010/0046418 A1 | 2/2010 | Horn et al. | |
| 2010/0056197 A1 | 3/2010 | Attar et al. | |
| 2010/0061361 A1 | 3/2010 | Wu | |
| 2010/0074209 A1* | 3/2010 | Montojo et al. | 370/329 |
| 2010/0091759 A1 | 4/2010 | Stahl et al. | |
| 2010/0098045 A1 | 4/2010 | Miyazaki | |
| 2010/0103845 A1 | 4/2010 | Ulupinar et al. | |
| 2010/0120442 A1 | 5/2010 | Zhuang et al. | |
| 2010/0131814 A1* | 5/2010 | Chiu | 714/748 |
| 2010/0135231 A1 | 6/2010 | Harada et al. | |
| 2010/0135251 A1 | 6/2010 | Sambhwani et al. | |
| 2010/0142433 A1 | 6/2010 | Womack et al. | |
| 2010/0182992 A1 | 7/2010 | Chun et al. | |
| 2010/0271999 A1* | 10/2010 | Yu et al. | 370/312 |
| 2010/0297993 A1* | 11/2010 | Heo et al. | 455/423 |
| 2010/0302998 A1 | 12/2010 | Bao et al. | |
| 2010/0322145 A1 | 12/2010 | Yu et al. | |
| 2010/0322194 A1* | 12/2010 | Hu et al. | 370/331 |
| 2010/0323612 A1* | 12/2010 | Xu et al. | 455/7 |
| 2010/0323614 A1 | 12/2010 | Yu et al. | |
| 2010/0323684 A1* | 12/2010 | Cai et al. | 455/422.1 |
| 2010/0325506 A1* | 12/2010 | Cai et al. | 714/748 |
| 2011/0026409 A1 | 2/2011 | Hu et al. | |
| 2011/0041027 A1* | 2/2011 | Fong et al. | 714/749 |
| 2011/0092212 A1 | 4/2011 | Kubota | |
| 2011/0110258 A1 | 5/2011 | Ishii et al. | |
| 2011/0261763 A1* | 10/2011 | Chun et al. | 370/329 |

FOREIGN PATENT DOCUMENTS

| | | |
|---|---|---|
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1940185 A1 | 7/2008 |
| EP | 1959708 A1 | 8/2008 |
| EP | 1995921 A2 | 11/2008 |
| JP | 2004328665 A | 11/2004 |
| JP | 2006311253 A | 11/2006 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118652 A | 5/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009539299 A | 11/2009 |
| JP | 2010504665 A | 2/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Yu, Yi, et al.; U.S. Appl. No. 13/216,819, filed Aug. 24, 2011; Title: Multiple-Input Multiple-Output (MIMO) with Relay Nodes.

Cai, Zhijun, et al.; U.S. Appl. No. 13/221,583, filed Aug. 30, 2011; Title: System and Method for Autonomous Combining.

Final Office Action dated Dec. 9, 2011; U.S. Appl. No. 12/331,992, filed Dec. 10, 2008; 24 pgs.

Office Action dated Nov. 8, 2011; U.S. Appl. No. 12/340,412, filed Dec. 19, 2008; 19 pgs.

Office Action dated Sep. 16, 2011; U.S. Appl. No. 12/340,432, filed Dec. 19, 2008; 33 pgs.

Office Action dated Nov. 10, 2011; U.S. Appl. No. 13/216,819, filed Aug. 25, 2011; 19 pgs.

PCT International Preliminary Report on Patentability; PCT Application No. PCT/US2009/062571; Mar. 10, 2011; 8 pgs.
Office Action dated Jan. 25, 2011, 39 pages, U.S. Appl. No. 12/337,207, filed Dec. 17, 2008.
Notice of Allowance dated Mar. 25, 2011, 11 pages, U.S. Appl. No. 12/337,214, filed Dec. 17, 2008.
Final Office Action dated Jan. 14, 2011, 16 pages, U.S. Appl. No. 12/337,222, filed Dec. 17, 2008.
Womack, James Earl, et al.; U.S. Appl. No. 12/331,992, filed Dec. 10, 2008; Title: Method and Apparatus for Discovery of Relay Nodes.
Womack, James Earl, et al.; U.S. Appl. No. 12/340,418, filed Dec. 19, 2008; Title: System and Method for Relay Node Selection.
Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple Output (MIMO) with Relay Nodes.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Motorola; TSG-RAN WG1 #54; Title: Classification of Relays; R1-083223; Jeju, South Korea; Aug. 18-22, 2008; 3 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Ericsson; TSG-RAN WG1 #53; Title: A Discussion on Some Technology Components for LTE-Advanced; R1-082024; Kansas City, Missouri; May 5-9, 2008; 11 pgs.
3GPP TR 36.913 v1.0.0; 3rd Generation Partnership Project; Technical Specification Group Radio Access Network; Requirements for Further Advancements for E-UTRA (LTE-Advanced); Release 8; May 2008; 13 pgs.
Soldani, David et al.; Title: Wireless Relays for Broadband Access; IEEE Communications Magazine; Mar. 2008; pp. 58-66.
Pabst, Ralf et al.; Title: Relay-Based Deployment Concepts for Wireless and Mobile Broadband Radio; IEEE Communications Magazine; Sep. 2004; pp. 80-89.
3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.
Panasonic; 3GPP TSG RAN WG1 Meeting #54; Title: Discussion on the Various Types of Relays; R1-082397; Warsaw, Poland; Jun. 30-Jul. 4, 2008; 6 pgs.
Research in Motion, Limited; 3GPP TSG RAN WG1 Meeting #55; Title: L2 Relay Interference Mitigation; R1-084102; Prague, Czech Republic; Nov. 10-14, 2008; 6 pgs.
Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.
PCT International Search Report; PCT Application No. PCT/US2009/062551; Jan. 28, 2010; 4 pgs.
PCT Written Opinion of the International Searching Authority; PCT Application No. PCT/US2009/062551; Jan. 28, 2010; 5 pgs.
PCT Communication Relating to the Results of the Partial International Search; PCT Application No. PCT/US2009/062554; Mar. 2, 2010; 7 pgs.
PCT International Search Report; PCT Application No. PCT/US2009/062557; Feb. 10, 2010; 4 pgs.
PCT Written Opinion of the International Searching Authority; PCT Application No. PCT/US2009/062557; Feb. 10, 2010; 7 pgs.
PCT International Search Report; PCT Application No. PCT/US2009/062560; Mar. 1, 2010; 4 pgs.
PCT Written Opinion of the International Searching Authority; PCT Application No. PCT/US2009/062560; Mar. 1, 2010; 7 pgs.
PCT International Search Report; PCT Application No. PCT/US2009/062570; Feb. 22, 2010; 4 pgs.
PCT Written Opinion of the International Searching Authority; PCT Application No. PCT/US2009/062570; Feb. 22, 2010; 8 pgs.
PCT Communication Relating to the Results of the Partial International Search; PCT Application No. PCT/US2009/062571; Feb. 12, 2010; 6 pgs.
PCT International Search Report; PCT Application No. PCT/US2009/064398; Mar. 18, 2010; 5 pgs.
PCT Written Opinion of the International Searching Authority; PCT Application No. PCT/US2009/064398; Mar. 18, 2010; 9 pgs.
Parkvall, Stefan, et al., The Evolution of WCDMA Towards Higher Speed Downlink Packet Data Access, XP-001082550, IEEE VTC, 2001, pp. 2287-2291.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062571; Apr. 19, 2010; 6 pgs.

PCT Written Opinion of the International Searching Authority; PCT Application No. PCT/US2009/062571; Apr. 19, 2010; 6 pgs.
PCT Communication Invitation to Pay Additional Fees and, Where Applicable, Protest Fee; PCT Application No. PCT/US2009/062574; Apr. 22, 2010; 8 pgs.
Office Action dated May 26, 2010, 20 pages, U.S. Appl. No. 12/337,214, filed Dec. 17, 2008.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
Final Office Action dated Jan. 5, 2012; U.S. Appl. No. 12/340,418, filed Dec. 19, 2008; 22 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.
Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.
Cai, Zhijun, et al.; U.S. Appl. No. 12/916,214, filed Oct. 29, 2010; Title: System and Method for Autonomous Combining.
Office Action dated Jul. 12, 2010, 40 pages, U.S. Appl. No. 12/337,207, filed Dec. 17, 2008.
Notice of Allowance dated Nov. 8, 2010, 10 pages, U.S. Appl. No. 12/337,214, filed Dec. 17, 2008.
Office Action dated Aug. 17, 2010, 25 pages, U.S. Appl. No. 12/337,222, filed Dec. 17, 2008.
Cai, Zhijun, et al.; U.S. Appl. No. 13/221,584, filed Aug. 30, 2011; Title: System and Method for Autonomous Combining.
Office Action dated Aug. 19, 2011; U.S. Appl. No. 12/331,992, filed Dec. 10, 2008; 52 pgs.
Office Action dated Jul. 21, 2011; U.S. Appl. No. 12/340,418, filed Dec. 19, 2008; 34 pgs.
Office Action dated Jun. 16, 2011; U.S. Appl. No. 12/340,412, filed Dec. 19, 2008; 33 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 12/337,214, filed Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Notice of Allowance dated Jun. 12, 2012; U.S. Appl. No. 12/337,207, filed Dec. 17, 2008; 20 pages.
Advisory Action dated Mar. 22, 2012; U.S. Appl. No. 12/337,235, filed Dec. 17, 2008; 10 pages.
Final Office Action dated Mar. 23, 2012; U.S. Appl. No. 12/340,432, filed Dec. 19, 2008; 28 pgs.
Notice of Allowance dated Jun. 20, 2012; U.S. Appl. No. 12/340,432, filed Dec. 19, 2008; 23 pages.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29th - Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Japanese Office Action; Application No. 2011-540716; Oct. 4, 2012; 15 pages.
Japanese Office Action; Application No. 2011-542161; Nov. 1, 2012; 17 pages.
Korean Office Action; Application No. 10-2011-7016626; Oct. 26, 2012; 8pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. 10-2011-7016425; Oct. 30, 2012; 9 pages.
Japanese Office Action; Application No. 2011-542177; Oct. 26, 2012; 10 pages.
Final Office Action dated Nov. 27, 2012; U.S. Appl. No. 12/916,214 filed Oct. 29, 2010; 16 pages.
Yu, Yi, et al.; U.S. Appl. No. 13/548,817; Filing Date: Jul. 13, 2012; Title: System and Method for Multi-User Multiplexing.
Office Action dated Oct. 2, 2012; U.S. Appl. No. 12/340,418 filed Dec. 19, 2008; 29 pgs.
Notice of Allowance dated Aug. 10, 2012; U.S. Appl. No. 12/340,412 filed Dec. 19, 2008; 17 pgs.
Office Action dated Oct. 12, 2012; U.S. Appl. No. 13/548,807 filed Jul. 13, 2012; 53 pages.
Notice of Allowance dated Sep. 11, 2012; U.S. Appl. No. 12/337,235 filed Dec. 17, 2008; 16 pages.
Office Action dated Aug. 9, 2012; U.S. Appl. No. 12/916,214 filed Oct. 29, 2010; 51 pages.
Korean Office Action; Application No. 10-2011-7015882; Sep. 18, 2012; 10 pages.
Korean Office Action; Application No. 10-2011-7016626; Jul. 17, 2012; 7pages.

* cited by examiner

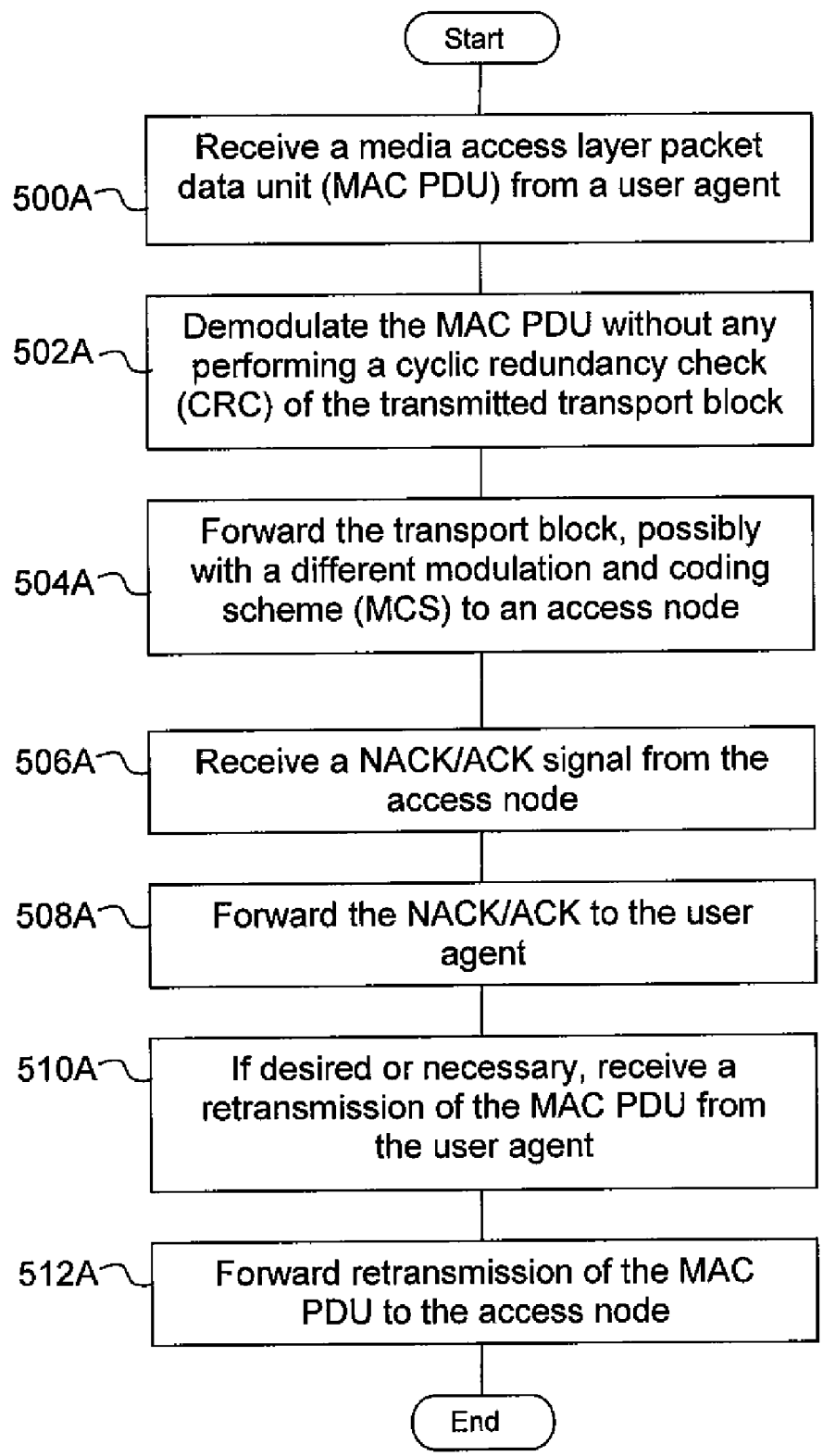

SYSTEM AND METHOD FOR HYBRID AUTOMATIC REPEAT REQUEST (HARQ) FUNCTIONALITY IN A RELAY NODE

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5A is a flowchart of a method in a relay node on an uplink, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
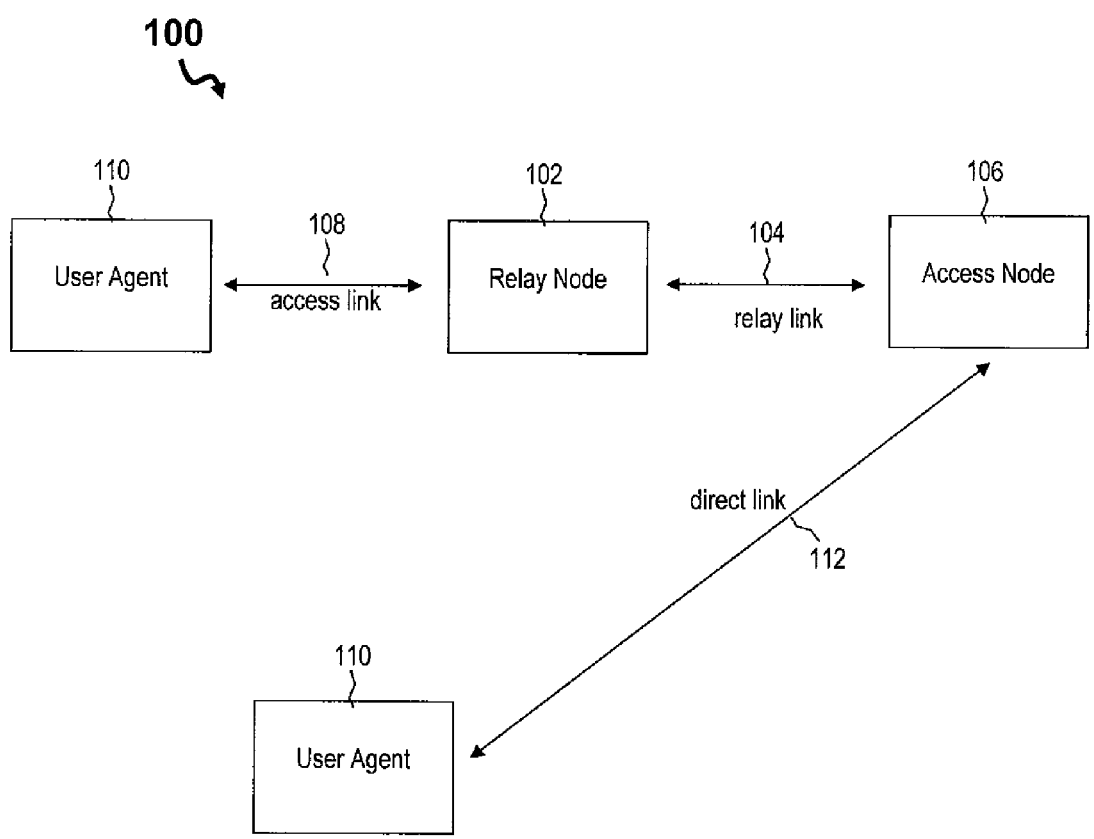
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of a wireless communication network includes LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, peak transmission power levels, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate within the same bandwidth creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Wireless communication systems may use error checking and correction systems to improve the quality of wireless communications. While error checking and correction systems have been implemented in user agents and/or access nodes that communicate directly with each other, introduction of relay nodes in wireless communications systems raise issues about implementing error checking and correction systems related to relay nodes.

The illustrative embodiments provide an error checking and correcting system in a wireless communication system that includes at least one relay node. In one illustrative embodiment, an error checking and correction system is implemented on the relay node. Implementing an error checking and correction system on a relay node can increase scheduling gain, and can have other benefits described further below.

In a specific illustrative embodiment, a relay node is in communication with an access node and a user agent. The relay node includes a hybrid automatic repeat request (HARQ) entity. HARQ is a variation of the "automatic repeat request" (ARQ) error control method. A HARQ entity is software and/or hardware that provides one or more HARQ functionalities. HARQ functionalities include, but are not limited to, retransmission combining techniques that enlist Chase combining or incremental redundancy, control of NACK/ACK transmissions, monitoring the number of retransmissions of MAC PDUs and ensuring that they do not exceed a maximum, and others as known in the art. The term "HARQ functionality," as used herein, contemplates one or more of these HARQ functionalities.

In either HARQ or ARQ, data and error detection information bits are first transmitted. If a recipient of the transmission detects no errors, the recipient accepts the data. If the recipient detects errors, the recipient might request a retransmission of data and error detection information or other error correction information that will help in the successful reception of the data.

In another illustrative embodiment, an end-to-end HARQ system is created between the access node and the user agent without the involvement of the relay node related to this error detection and correction. Thus, this illustrative embodiment does not necessarily require implementing a HARQ entity on a relay node. This particular illustrative embodiment is described with respect to FIG. 2. The devices described with respect to FIG. 2 can be characterized as one or more processors configured to promote the actions described in the embodiments provided below.

Figure 2:
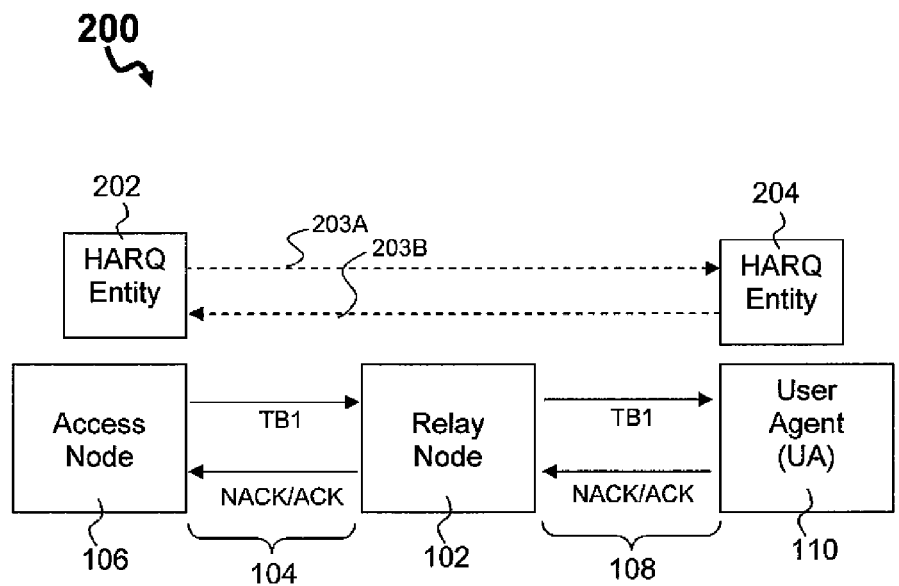
FIG. 2 is a block diagram illustrating an end-to-end hybrid automatic repeat request (HARQ) communication system, according to an embodiment of the disclosure.

FIG. 2 is a block diagram illustrating an end-to-end HARQ communication system 200, according to an embodiment of the disclosure. The system 200 includes the access node 106 in communication with the user agent 110 via the relay node 102. The access node 106 and the user agent 110 include peer Hybrid Automatic Repeat Request (HARQ) entities 202 and 204, respectfully.

When the access node 106 sends a medium access control (MAC) packet data unit (PDU) to the relay node 102, the relay node 102 will demodulate and decode the MAC PDU (transport block 1 (TB1)) without any cyclic redundancy check (CRC) (error detection) of TB1. Then, the relay node 102 will forward the transport block 1 (TB1) with a possible different modulation and coding scheme (MCS) to the user agent 110.

After the user agent 110 receives the transport block 1, the user agent 110 will perform the CRC and send a non-acknowledgement/acknowledgement (NACK/ACK) signal to the relay node 102, as shown by arrow 108. (Arrow 108 can also represent the access link.) In turn, the relay node 102 will forward the NACK/ACK to the access node 106, as shown by arrow 104. (Arrow 104 can also represent the relay link.) Based on the received NACK/ACK information, the access node 106 will perform the retransmission of the transport block 1 (the MAC PDU) or transmission of other error detection and correction information, if desired or necessary.

Similarly in the uplink, when the UA 110 sends a MAC PDU to the relay node 102, the relay node will demodulate and decode the MAC PDU without any CRC (error detection)

of the transmitted transport block (TB). Then the relay node 102 will forward the TB with a possible different MCS to the access node 106. After the access node 106 receives the TB, the access node 106 will perform the CRC and send a NACK/ACK signal to the relay node 102 based on the result. Then the relay node 102 will forward the NACK/ACK to the UA 110. The UA 110 may perform the retransmission of the TB or transmission of other error detection and correction information if a NACK is received.

A major benefit of the illustrative embodiment shown in FIG. 2 is that the relay node 102 need not provide HARQ functionality. However, several disadvantages of this system may exist.

One disadvantage is that an error at the relay link 104 will be propagated to the access link access link 108. Error propagation can cause unnecessary battery drain for the user agent 110. Considering that a ten percent block error rate (BLER) may be common for the initial transmission, unnecessary battery drain in the user agent is likely.

Another disadvantage may be in the difficulty of controlling timing relationship between the packet transmission and the NACK/ACK feedback due to possible variable scheduling delays in the relay node when performing forwarding. Furthermore, additional complexity may exist on the resource link between the packet transmission and associated NACK/ACK (i.e., the resource to be used to transmit a NACK/ACK for a certain packet transmission), partially due to this possible variable delay.

Yet another disadvantage may be that radio link conditions differ between the relay link (arrow 104) and the access link (arrow 108). In the illustrative embodiment shown in FIG. 2, the size of TB1 (the MAC PDU) has to be the same on the relay link 104 and the access link 108. However, if the radio conditions change, keeping the same transport block size for the transmission limits the scheduling gain, and may also affect throughput.

Still another disadvantage may be that the NACK/ACK error ratio may be greater because two links (relay and access) are involved for the NACK/ACK feedback. However, these problems may be overcome by implementing a HARQ entity on the relay node 102 itself. This system is shown in FIG. 3.

Figure 3:
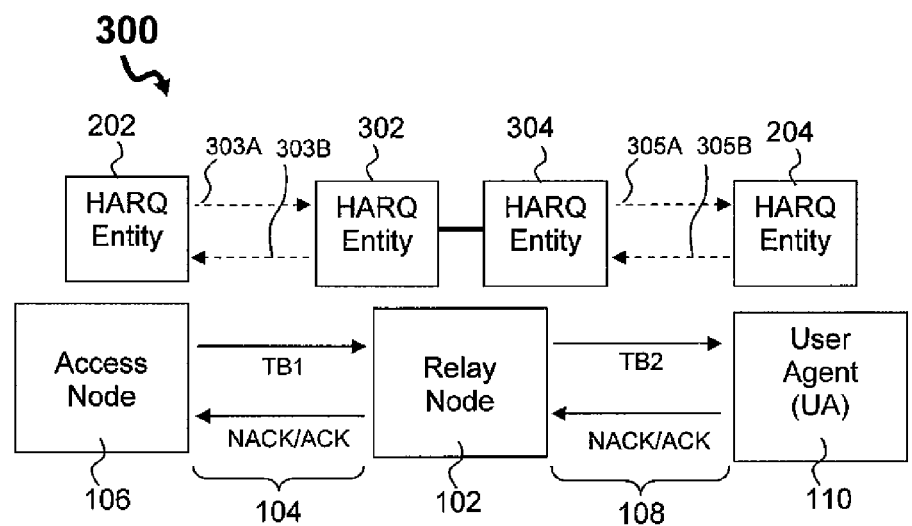
FIG. 3 is a block diagram illustrating an independent hybrid automatic repeat request (HARQ) communication system, according to an embodiment of the disclosure.

FIG. 3 is a block diagram illustrating an independent HARQ communication system 300 according to an embodiment of the disclosure. The independent HARQ communication system 300 shown in FIG. 3 includes objects described with respect to FIG. 1 and FIG. 2. Thus, FIGS. 2 and 3 have some common reference numerals that refer to similar objects. The devices described with respect to FIG. 3 can be characterized as one or more processors configured to promote the actions described in the embodiments provided below.

However, in addition to the user agent 110 and the access node 106 having HARQ entities 202 and 204, respectfully, the relay node 102 includes its own HARQ entities 302 and 304. HARQ entities 302 and 304 handle decoding and encoding of error detection and correction bits on the relay node 102. HARQ entities 302 and 304 could be separate entities, but could also be characterized as a single HARQ entity. As with the description of FIG. 2, a HARQ entity can be implemented using software, firmware or hardware, or any combination that can implement HARQ functionality.

In the illustrative system 300 shown in FIG. 3, both the relay link 104 and the access link 108 operate with respect to their own independent HARQ entities, HARQ entity 302 and HARQ entity 304, respectively. HARQ entity 302 and HARQ entity 304 are stored on or are a part of relay node 102.

When the access node 106 sends a data packet and error detection information to the relay node 102, as shown by arrow 303A, the relay node 102 will demodulate and decode the data packet and perform cyclic redundancy check (CRC) (error detection). The relay node 102 will then send a NACK/ACK to the access node 106, as shown by arrow 303B. In turn, the access node 106 will perform a HARQ retransmission, if desired or necessary.

When the relay node 102 successfully receives the MAC PDU as determined by the HARQ entity 302, the relay node 102 will deliver the received MAC PDU to a higher layer. Then, the relay node 102 will further schedule and transmit the data to the user agent user agent 110, where the HARQ entity 304 handles HARQ processing for the relay node 102 of the data to be sent to the user agent 110. The relay node 102 may resegment the MAC PDU depending on the radio conditions, as shown by arrow 305A. After the user agent 110 receives the data, the user agent 110 will send a NACK/ACK to the relay node 102, as shown by arrow 305B. In turn, the relay node 102 will perform HARQ retransmission, if required or desired. No direct feedback to the access node is necessary from the user agent 110.

Similarly in the uplink, when the UA 110 sends a MAC PDU to the relay node 102, the relay node 102 will demodulate and decode the MAC PDU and perform a cyclic redundancy check (CRC). These functions are examples of HARQ functionalities, though fewer or more HARQ functionalities exist and could be used, as known in the art. The relay node 102 will then send a NACK/ACK to the UA 110 based on the results of the CRC. In turn, the UA 110 will perform HARQ retransmission, if desired or necessary. When the relay node 102 successfully receives the MAC PDU, the relay node 102 may deliver the data to the RLC layer and then the relay node may schedule and send the data to the access node 106. The relay node 102 may resegment or concatenate the data depending on the radio conditions. After the access node 106 receives the MAC PDU, it will perform a CRC. Based on the results of the CRC, the access node 106 will send a NACK/ACK to the relay node 102. In turn, the relay node 102 will perform a retransmission, if required or desired. No direct feedback to the UA 110 is necessary from the access node 106.

The illustrative embodiment shown in FIG. 3 may have several benefits. For example, the relay node 102 forwards the MAC PDU only when no errors are detected. This feature allows for more efficient use of resources of the access link 108.

Another benefit to the solution shown in FIG. 3 is that exploitation of the specific radio condition on each link is possible. For example, the MAC protocol, radio link control protocol or packet data converged protocol can segment or concatenate MAC PDUs, allowing for a different transport block size (TBS) on the access link 108 and higher scheduling gain. A further benefit to the solution shown in FIG. 3 is that the fixed timing between the packet transmission and the NACK/ACK transmission is maintained.

While the embodiments described with respect to FIG. 3 contemplate a relay node having two HARQ entities, other embodiments could also be implemented. For example, a single HARQ entity could be implemented in relay node 102, with the single HARQ entity performing both functions of the separate HARQ entities, HARQ entity 302 and HARQ entity 304.

Additionally, the embodiments contemplate multiple relay nodes between access node 106 and user agent 110. Each one of the additional relay nodes could have one HARQ entity, two HARQ entities, or no HARQ entities. In the latter case, the relay node would only relay a signal without performing some HARQ functionality.

Furthermore, if desired, more than two HARQ entities could be implemented on one or more relay nodes. Multiple HARQ entities could be assigned to handle different sets of UAs, different access nodes, or be used for other purposes.

Figure 4A:
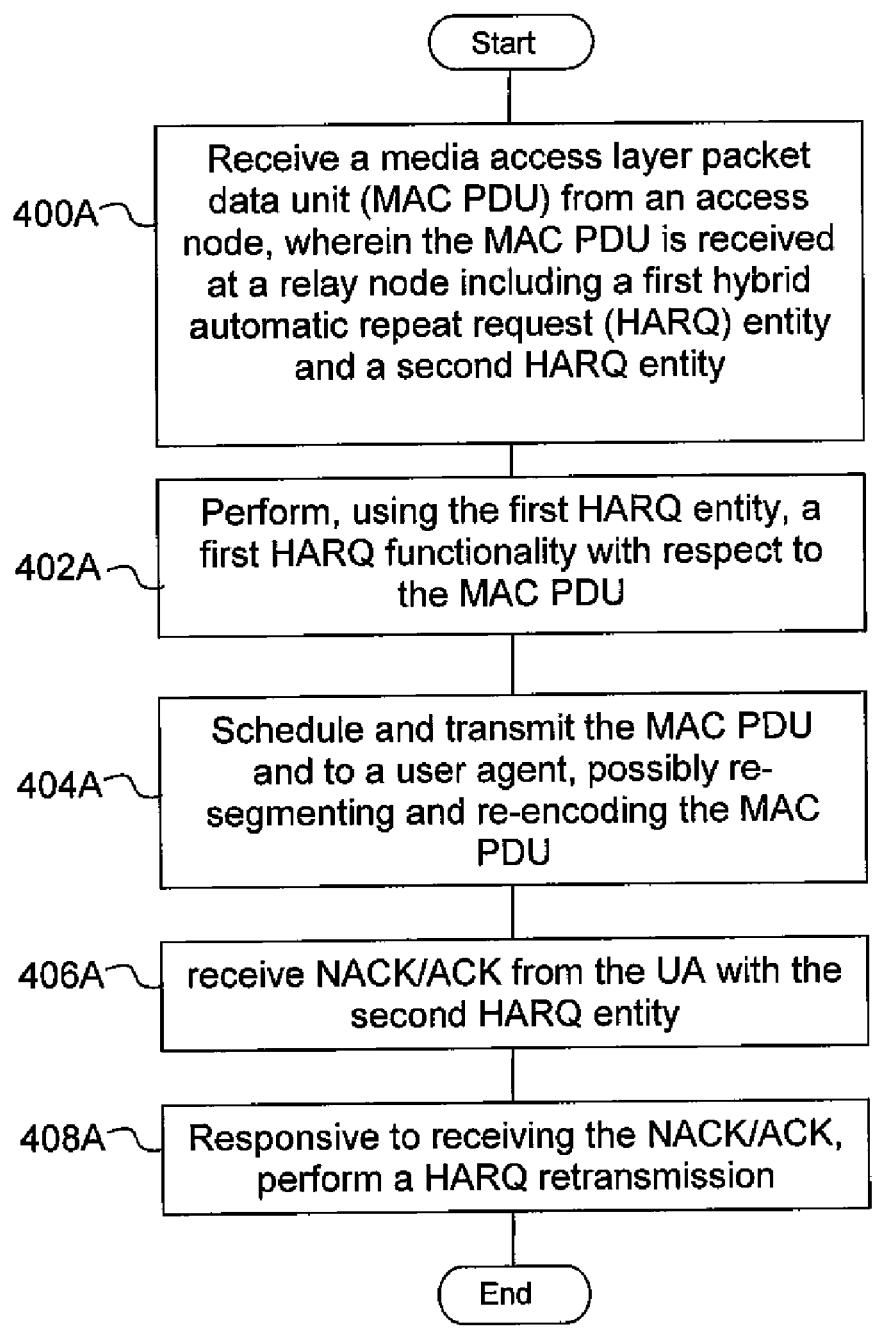
FIG. 4A is a flowchart of a method in a relay node on a downlink, according to an embodiment of the disclosure.

FIG. 4A is a flowchart of a method in a relay node on a downlink, according to an embodiment of the disclosure. An example of a relay node and its operation are described above, and in particular with respect to FIGS. 1-3. The process can be implemented using software, hardware, firmware, or a combination thereof.

The process begins as the relay node receives a MAC PDU from an access node, wherein the MAC PDU is received at a relay node including a first hybrid automatic repeat request (HARQ) entity and a second HARQ entity (block 400A). The relay node then performs, using the first HARQ entity, a first HARQ functionality with respect to the MAC PDU (block 402A). This first HARQ functionality may terminate the HARQ process for the MAC PDU between the access node and relay node.

Next, the relay node may re-segment and re-encode the MAC PDU before the relay node schedules and transmits the MAC PDU to a user agent (block 404A). Thereafter, the relay node may receive a NACK/ACK from the UA with the second HARQ entity (block 406A). Finally, responsive to receiving the NACK/ACK, the relay node may perform a HARQ retransmission (block 408A). The process terminates thereafter.

As provided in block 404A, a possibility exists that the relay node changes the MAC PDU. For example, the relay node could resegment or concatenate the MAC PDUs, re-encode the MAC PDUs, or both resegment and re-encode the MAC PDU. In any of these three cases, the relay node schedules and transmits the MAC PDU.

In the embodiment provided in FIG. 4A, a single relay node with two HARQ entities is described. However, the embodiments also contemplate variations on this technique. For example, two or more relays could be used between the UA and the access node. For one or more of the relay nodes, as with the single relay node described in FIG. 4A, each relay node could have two HARQ entities. However, one or more relay nodes could instead have no HARQ entities, with the method proceeding as shown in FIG. 4A for those relay nodes that do have HARQ entities. Additionally, one or more relay nodes could instead have a single HARQ entity that performs the function of the two separate HARQ entities described above. Other modifications to these embodiments could also be implemented.

Figure 4B:
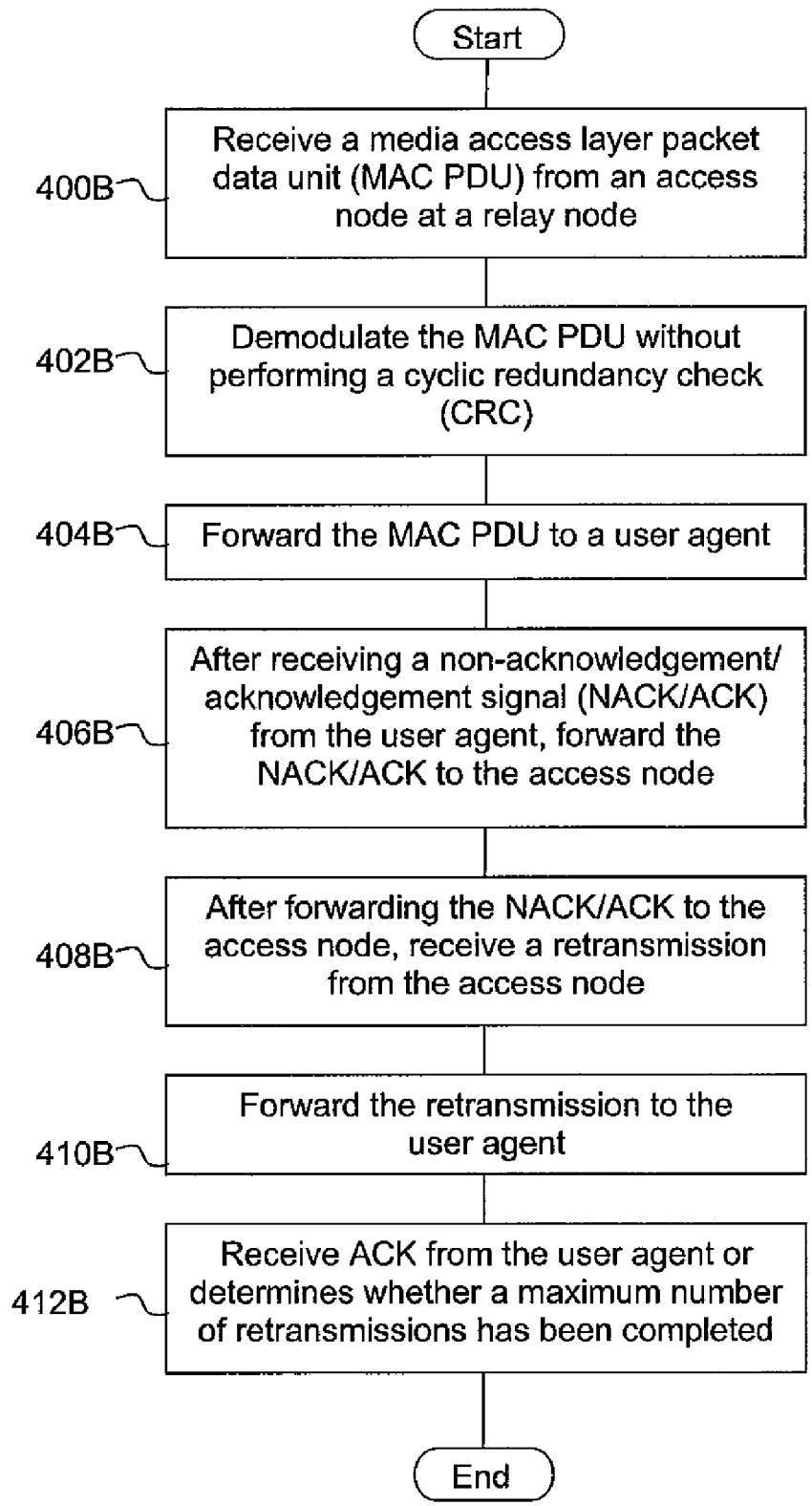
FIG. 4B is a flowchart of a method in a relay node on a downlink, according to an embodiment of the disclosure.

FIG. 4B is a flowchart of a method in a relay node on a downlink, according to an embodiment of the disclosure. An example of a relay node and its operation are described above, and in particular with respect to FIGS. 1-3. The process can be implemented using software, hardware, firmware or a combination thereof.

The process begins as the relay node receives a MAC PDU from an access node (block 400B). The relay node then demodulates the MAC PDU without performing a cyclic redundancy check (CRC) (block 402B). The relay node then forwards the MAC PDU to a user agent (block 404B). The modulation may be different, but the MAC PDU may not be re-segmented. The MAC PDU may or may not be re-encoded.

After receiving a non-acknowledgement/acknowledgement signal (NACK/ACK) from the user agent, the relay node forwards the NACK/ACK to the access node (block 406B). After forwarding the NACK/ACK to the access node, the relay node may receive a retransmission from the access node (block 408B). The relay node then forwards the retransmission to the user agent (block 410B). The relay node then either receives an ACK signal from the UA, or determines whether a maximum number of retransmissions has been completed (block 412B). If an ACK is received, or a maximum number of retransmissions has been completed, then the process terminates. If a maximum number of retransmissions has not been completed, then the process could return to step 406 and repeat until the maximum number of allowed retransmissions has been completed.

FIG. 5A is a flowchart of a method in a relay node on an uplink, according to an embodiment of the disclosure. An example of a relay node and its operation are described above, and in particular with respect to FIGS. 1-3. The process can be implemented using software, hardware, firmware or a combination thereof.

The process begins as the relay node receives a MAC PDU from a UA (block 500A). The relay node then demodulates the MAC PDU without any CRC of the transmitted transport block (bock 502A). The relay node forwards the transport block, possibly with a different MCS (modulation and coding scheme), to an access node (block 504A). Subsequently, the relay node receives a NACK/ACK signal from the access node (block 506A). In turn, the relay node forwards the NACK/ACK to the UA (block 508A). If desired or necessary, the relay node receives a retransmission of the MAC PDU from the UA (block 510A) and then forwards the retransmission of the MAC PDU to the access node (block 512A). The process terminates thereafter.

Figure 5B:
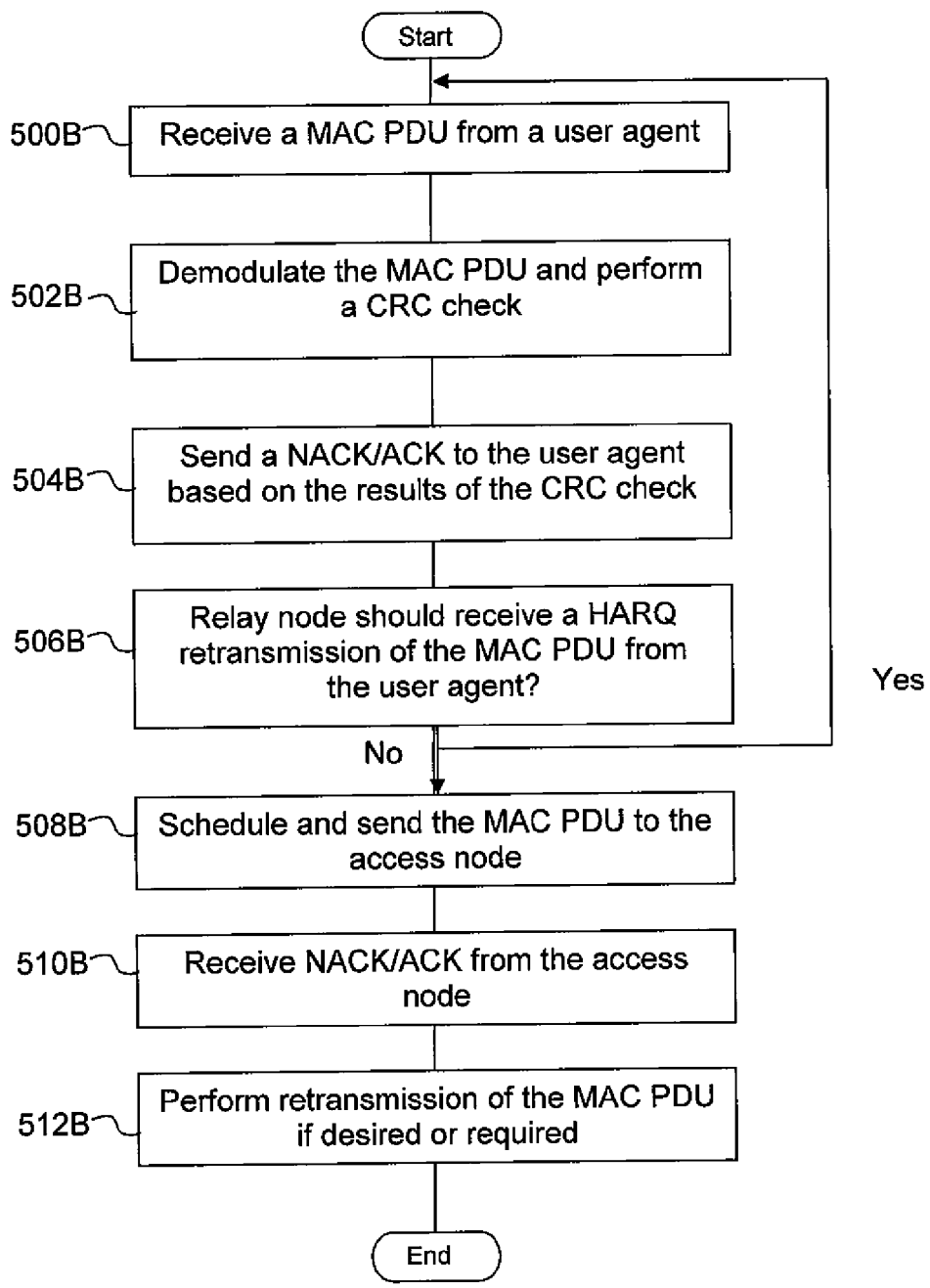
FIG. 5B is a flowchart of a method in a relay node on an uplink, according to an embodiment of the disclosure.

FIG. 5B is a flowchart of a method in a relay node on an uplink, according to an embodiment of the disclosure. An example of a relay node and its operation are described above, and in particular with respect to FIGS. 1-3. The process can be implemented using software, hardware, firmware or a combination thereof. In the embodiments of FIG. 5B, the various functions implemented in the relay node could be implemented by one or more HARQ entities, as provided with respect to FIG. 3.

The process begins as the relay node receives a MAC PDU from a user agent at a first HARQ entity (bock 500B). The relay node 102, using the first HARQ entity, demodulates the MAC PDU and may perform a cyclic redundancy check (CRC) (block 502B). These functions are examples of HARQ functionalities, though fewer or more HARQ functionalities exist and could be used, as known in the art.

The relay node 102 will then send, using the first HARQ entity, a NACK/ACK to the UA based on the results of the CRC (block 504B). Based on the results of the NACK/ACK, a determination is made if the relay node should receive a HARQ retransmission of the MAC PDU from the UA (block 506B). If a HARQ retransmission is desired or necessary, then the process returns to step 500B and repeats.

If HARQ retransmission is not desired or possibly is not necessary, then once the relay node receives the MAC PDU, the relay node will schedule and send the MAC PDU to the access node using a second HARQ entity (bock 508B). In an embodiment, the relay node's second HARQ entity may resegment or concatenate the MAC PDUs, depending on radio conditions. The relay node then waits to receive a signal from the access node, which itself may perform a CRC check. The relay node will receive a NACK/ACK from the access node at the second HARQ entity (block 510B). In turn, the relay node will perform a retransmission to the access node, if desired or required (block 512B). The process terminates thereafter. Note that no direct feedback to or from the UA is necessary between the UA and the access node.

In the embodiments provided in FIG. 5B, a single relay node with two HARQ entities is used to implement the above-described methods. However, the embodiments also contemplate variations on this technique. For example, two or more relays could be used between the UA and the access node. For one or more of the relay nodes, as with the single relay node described in FIG. 5B, each relay node could have two HARQ entities. However, one or more relay nodes could instead have no HARQ entities, with the method proceeding as shown in FIG. 5B for those relay nodes that do have HARQ entities. Additionally, one or more relay nodes could instead have a single HARQ entity that performs the function of the two separate HARQ entities described above. Other modifications to these embodiments could also be implemented.

Figure 6:
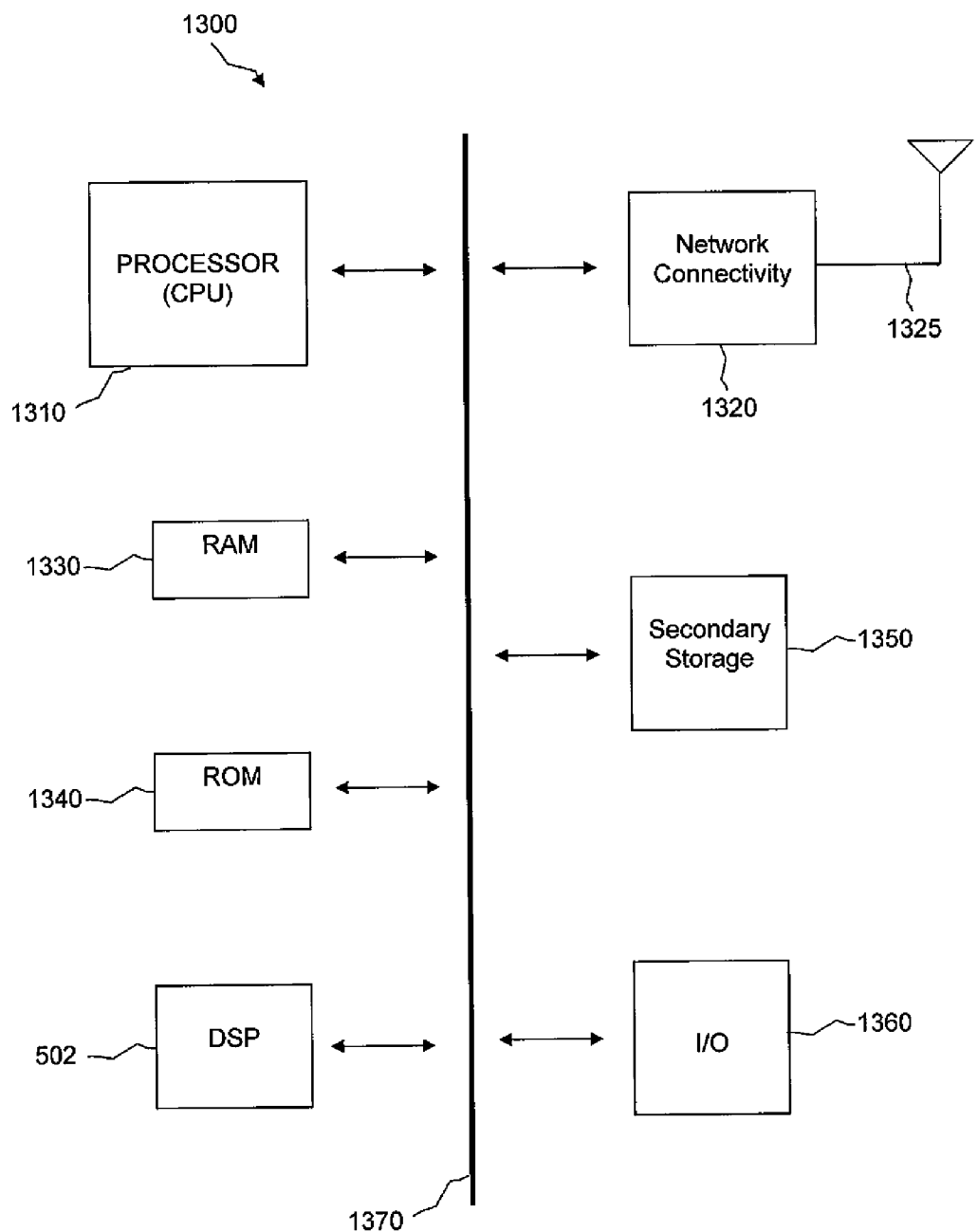
FIG. 6 illustrates a processor and related components suitable for implementing the several embodiments of the present disclosure.

The user agent 110 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.300, 3GPP TS 36.321.

As described herein, the illustrative embodiments provide for a relay node. The relay node includes a first hybrid automatic repeat request (HARQ) entity providing a first HARQ functionality. The relay node further includes a second HARQ entity providing a second HARQ functionality.

The illustrative embodiments also provide for a relay node having a different configuration. In this different configuration, the relay node is configured to receive a medium access control packet data unit (MAC PDU) from an access node, demodulate and decode the MAC PDU without performing a cyclic redundancy check (CRC), forward the MAC PDU to a user agent, and, after receiving a non-acknowledgement/acknowledgement signal (NACK/ACK) from the user agent, forward the NACK/ACK to the access node.

The illustrative embodiments also provide for a method implemented in a relay node comprising a first hybrid automatic repeat request (HARQ) entity providing a first HARQ functionality and a second HARQ entity providing a second HARQ functionality. The method includes receiving a medium access control packet data unit (MAC PDU) from an access node, and performing, with the first HARQ entity, a first HARQ functionality with respect to the MAC PDU.

The illustrative embodiments also provide for a different method implemented in a relay node comprising a first hybrid automatic repeat request (HARQ) entity providing a first HARQ functionality and a second HARQ entity providing a second HARQ functionality. In this method, a medium access control packet data unit (MAC PDU) is received from an access node. Using the first HARQ entity, a first HARQ functionality is performed with respect to the MAC PDU.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A relay node device that promotes data communication between an access node and a user agent, the relay node device comprising:
    at least one processor to manage:
        a first hybrid automatic repeat request (HARQ) entity providing a first HARQ functionality in connection with the access node; and
    a second HARQ entity providing a second HARQ functionality in connection with the user agent.

2. The relay node device of claim 1, wherein the relay node device is configured to receive a medium access control packet data unit (MAC PDU) from the access node, and wherein the first HARQ entity is configured to perform HARQ functionality with respect to the MAC PDU.

3. The relay node device of claim 1, wherein the relay node device is configured to transmit a medium access control packet data unit (MAC PDU) to the access node, and wherein the first HARQ entity is configured to perform HARQ functionality with respect to the MAC PDU.

4. The relay node device of claim 1, wherein the relay node device is configured to transmit a medium access control packet data unit (MAC PDU) to the user agent, and wherein the second HARQ entity is configured to perform HARQ functionality with respect to the MAC PDU.

5. The relay node device of claim 1, wherein the relay node device is configured to receive a medium access control packet data unit (MAC PDU) from the user agent, and wherein the second HARQ entity is configured to perform HARQ functionality with respect to the MAC PDU.

6. The relay node device of claim 2, wherein the relay node device is further configured to perform a cyclic redundant check (CRC) and to transmit a non-acknowledgement/acknowledgement (NACK/ACK) signal to the access node.

7. The relay node device of claim 6, wherein the relay node device is further configured to schedule and send the MAC PDU to the user agent.

8. The relay node device of claim 7, wherein the relay node device is further configured to receive a non-acknowledgement/acknowledgement (NACK/ACK) from the user agent.

9. The relay node device of claim 8, wherein the relay node device is further configured, responsive to receiving the non-acknowledgement signal (NACK), to perform a hybrid automatic repeat request (HARQ) retransmission.

10. The relay node device of claim 8, wherein the relay node device is configured to avoid retransmission to the access node when an ACK is received.

11. The relay node device of claim 2, wherein the relay node device is configured to avoid transmitting the MAC PDU to the user agent unless the MAC PDU is free of errors when received from the access node.

12. The relay node device of claim 2, wherein the relay node device is configured to break apart the MAC PDU to create smaller transport block sizes (TBS).

13. The relay node device of claim 8, wherein the relay node device is further configured to maintain a fixed timing between transmission of the MAC PDU and the NACK/ACK.

14. A device comprising:
    a relay node that promotes data communication between an access node and a user agent, wherein the relay node is configured to:
        receive a medium access control packet data unit (MAC PDU) from the access node;
        demodulate and decode the MAC PDU without performing a cyclic redundancy check (CRC);
        forward the MAC PDU to the user agent; and
        after receiving a non-acknowledgement/acknowledgement signal (NACK/ACK) from the user agent, forward the NACK/ACK to the access node.

15. The device of claim 14, wherein the relay node is further configured to:
    after forwarding the NACK/ACK to the access node, receive a retransmission from the access node; and
    forward the retransmission to the user agent.

16. A method implemented in a relay node that promotes data communication between an access node and a user agent, the relay node comprising a first hybrid automatic repeat request (HARQ) entity having a first HARQ functionality, the method comprising:
    receiving a medium access control packet data unit (MAC PDU) at the first HARQ entity; and
    performing, with the first HARQ entity, a first HARQ functionality with respect to the MAC PDU.

17. The method of claim 16, further comprising:
    receiving the medium access control packet data unit (MAC PDU) from the access node.

18. The method of claim 16, further comprising:
    transmitting the medium access control packet data unit (MAC PDU) to the access node; and
    the first HARQ entity performing HARQ functionality with respect to the MAC PDU.

19. The method of claim 16, wherein the relay node further comprises a second HARQ entity having a second HARQ functionality, the method further comprising:
    transmitting the medium access control packet data unit (MAC PDU) to the user agent; and
    the second HARQ entity performing second HARQ functionality with respect to the MAC PDU.

20. The method of claim 16, wherein the relay node further comprises a second HARQ entity having a second HARQ functionality, the method further comprising:
    receiving a medium access control packet data unit (MAC PDU) from the user agent; and
    the second HARQ entity performing second HARQ functionality with respect to the MAC PDU.

21. The method of claim 16, further comprising:
    scheduling the MAC PDU; and
    sending the MAC PDU.

22. The method of claim 21, further comprising:
    receiving a non-acknowledgement/acknowledgement (NACK/ACK) signal.

23. The method of claim 22, further comprising:
    responsive to receiving the non-acknowledgement signal (NACK), performing a hybrid automatic repeat request (HARQ) retransmission.

24. The method of claim 22, wherein a retransmission is avoided when an ACK is received.

25. The method of claim 19, wherein transmission of the MAC PDU to the user agent is avoided unless the MAC PDU is free of errors when received at the first HARQ entity.

26. The method of claim 16, further comprising:
breaking apart the MAC PDU to create smaller transport block sizes (TBS).

27. The method of claim 16, further comprising;
maintaining a fixed timing between transmission of the MAC PDU and the NACK/ACK.

28. A method implemented in a relay node that promotes data communication between an access node and a user agent, the method comprising:
receiving a medium access control packet data unit (MAC PDU);
demodulating and decoding the MAC PDU without performing a cyclic redundancy check (CRC);
forwarding the MAC PDU; and
after receiving a non-acknowledgement/acknowledgement signal (NACK/ACK), forwarding the NACK/ACK signal.

29. The method of claim 28, further comprising:
after forwarding the NACK/ACK, receiving a retransmission; and
forwarding the retransmission.

\* \* \* \* \*